US005550335A

United States Patent [19]

Ermert et al.

[11] Patent Number: 5,550,335

[45] Date of Patent: Aug. 27, 1996

[54] RESONANCE ABSORBER

[75] Inventors: Klaus Ermert, Grasbrunn; Arno Röder; Klaus Zimmermann, both of München, all of Germany

[73] Assignee: Deutsche Aerospace AG, Germany

[21] Appl. No.: 352,138

[22] Filed: Dec. 1, 1994

[30] Foreign Application Priority Data

Dec. 16, 1993 [DE] Germany .......................... 43 43 008.2

[51] Int. Cl.$^6$ ...................................................... F16F 15/00

[52] U.S. Cl. ........................... 181/207; 181/208; 188/378

[58] Field of Search .................................... 181/207, 208, 181/209; 188/378, 379, 380; 248/559

[56] References Cited

U.S. PATENT DOCUMENTS

| | | | |
|---|---|---|---|
| 3,327,812 | 6/1967 | Lazan | 181/207 |
| 4,339,018 | 7/1982 | Warnaka . | |
| 4,353,586 | 10/1982 | Raquet et al. . | |
| 4,355,578 | 10/1982 | Raquet . | |
| 4,392,681 | 7/1983 | Raquet | 181/209 X |
| 4,627,635 | 12/1986 | Koleda | 188/378 |
| 4,716,986 | 1/1988 | Umemoto et al. . | |
| 4,924,976 | 5/1990 | Bernett . | |
| 5,240,221 | 8/1993 | Thomasen | 181/207 |

FOREIGN PATENT DOCUMENTS

| | | |
|---|---|---|
| 925745 | 9/1947 | France . |
| 2163798 | 7/1973 | Germany . |
| 2906169 | 8/1980 | Germany . |
| 3119499 | 12/1982 | Germany . |
| 90/07673 | 7/1990 | WIPO . |

*Primary Examiner*—Khanh Dang
*Attorney, Agent, or Firm*—Evenson, McKeown, Edwards & Lenahan P.L.L.C.

[57] ABSTRACT

A resonance absorber for the damping of structure-borne vibrations has a number of freely swinging slats with different resonance frequencies. The slats are arranged on a common base which can be connected with a body to be damped, and are constructed as double slats comprising a damping coating which is in each case squeezed between the two slats elements.

22 Claims, 1 Drawing Sheet

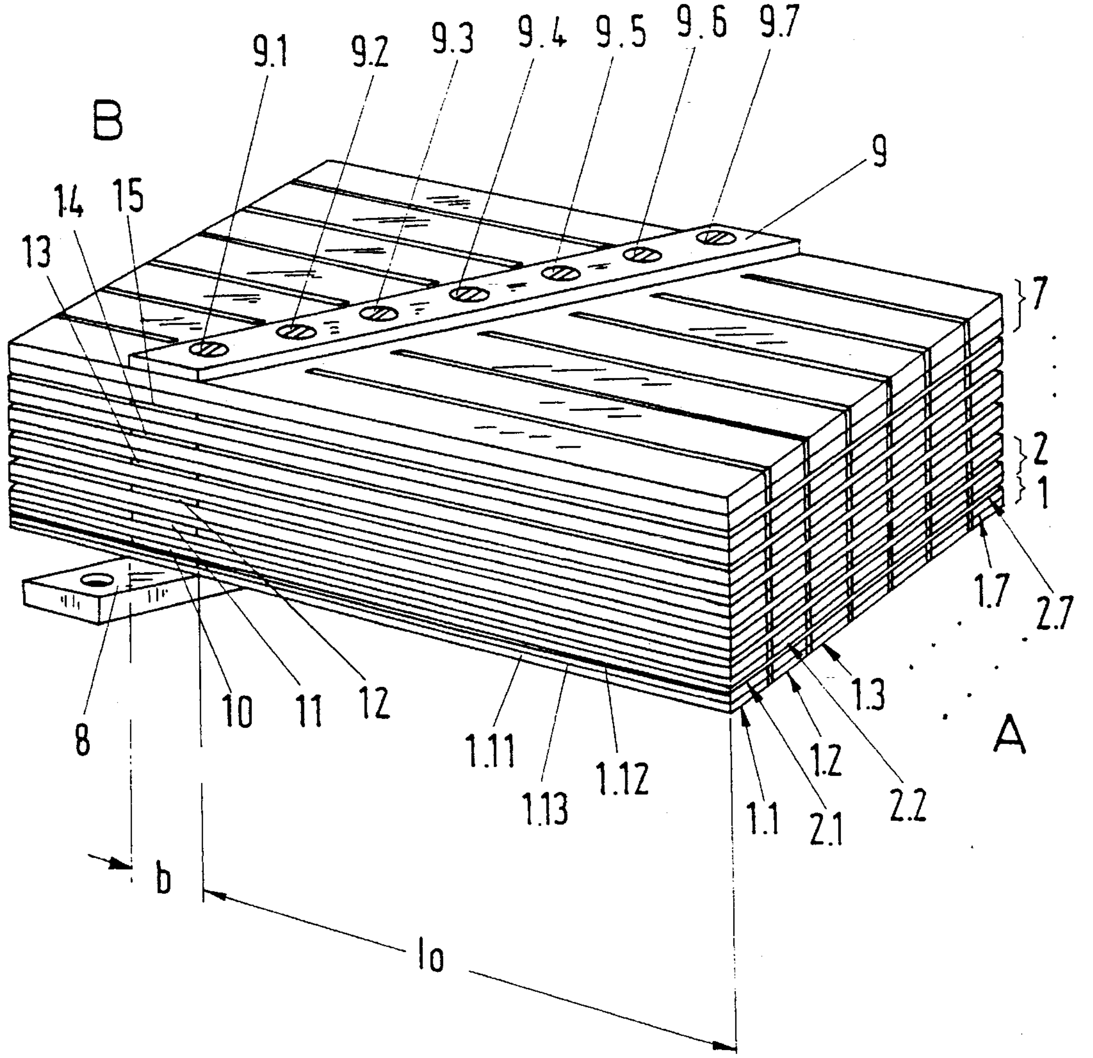
9.1
9.2
9.3
9.4
9.5
9.6
9.7
9
B
14
15
13
7
2
1
1.7
2.7
1.3
A
8
10
11
12
1.11
1.13
1.12
1.1
2.1
1.2
2.2
b
lo

RESONANCE ABSORBER

BACKGROUND AND SUMMARY OF THE INVENTION

This invention relates to a device for damping structure-borne noise vibrations, comprising a number of free-swinging vibration absorbing elements in the form of slats, with different resonance frequencies. The slats are arranged on a common base which can be connected with a body to be damped.

Vibration absorbers of the above-mentioned type are known, for example, from German Patent Document DE 1 071 364 or German Patent Document DE-OS 2 163 798. In the case of these vibration absorbers, the resonance frequency of the individual slats is coordinated with the vibrations of the body to be damped. The slats, which are excited in this manner to carry out resonance vibrations, therefore absorb vibration energy from the body to be damped which, by an appropriate damping of the slats, will finally be converted to heat.

To increase the vibration-damping effect, it is known from European Patent Application EP 0 020 284 B1 to stack plate-shaped slats above one another, with layers of a damping material being arranged between the slats. The individual slats and the damping material are coordinated with one another so that the individual plates vibrate against one another and in the process compress and relax the damping material. In such a resonance vibration absorber, the intermediate layers made of damping material must be relatively thick and soft, in order to avoid excessive coupling between the individual slats, which would change the whole vibration behavior.

It is an object of the present invention to provide a vibration absorber of the above-mentioned type which, while the effect is the same, permits a more compact construction, can be coordinated with a frequency range which is as wide as possible, and requires smaller amounts of damping material than previously.

This object is achieved by the vibration absorber according to the invention which on the one hand has freely swinging slats that are constructed as double slats but are not vibrationally coupled to adjacent double slats and therefore exhibit a defined vibration behavior. On the other hand, to increase the damping of one double slat respectively, a known technology referred to as a "squeezed coating" is used for the damping of bending vibrations of thin metal sheets. In this case, the damping layer is deformed by shearing rather than by compressing or relaxing, so that the damping layers may be extremely thin.

The slats may be arranged either side-by-side in a layer, as, for example, according to German Patent Document DE 2 163 798, or sandwiched above one another, as, for example, corresponding to German Patent Document DE 1 071 364 or European Patent Document EP 0 020 284 B1. In a particularly compact arrangement, several layers having a congruent outer circumference are stacked above one another so that a block of freely swinging double slats is created, which are arranged in a linear and column-shaped manner.

Other objects, advantages and novel features of the present invention will become apparent from the following detailed description of the invention when considered in conjunction with the accompanying drawings.

BRIEF DESCRIPTION OF THE DRAWING

The single Figure is a partially schematic depiction of the vibration absorbing element according to the invention.

DETAILED DESCRIPTION OF THE DRAWING

The resonance absorber illustrated in the figure comprises seven layers (1 to 7) of double slats 1.1, 1.2, 1.3 . . . , each layer being made of two congruent metal plates of the same thickness. On two opposite ends A and B, the plates are notched in the manner of a comb. A base strip 8 of a width b extends diagonally over the plate surface, and remains unnotched. Congruently extending spacer pieces 10 to 15 inserted between the individual layers parallel to the base strip acoustically couple the individual plates in the area of the base strip 8. The layers and the spacer pieces are held together by means of the base strip 8 and a so-called adapter plate 9 by means of tightening screws 9.1 to 9.7. Particularly in mass production of the absorbers, the spacer pieces may also be integrated directly with the plates, for example, by means of corresponding casting molds for the plates or by a stamping or milling of flat plates. By way of the base plate 8, the resonance absorber is connected with a body to be damped in a force and moment-locking manner.

Before stacking and cutting, a damping layer for instance type E3512A+B from Company Permabond is applied between the two plates of a layer (1 to 7) so that a sandwich-type structure is created. After the cutting of the plates, double slats 1.1, 1.2, . . . 1,7 are created in this manner, each comprising two metallic slat elements, for example, 1.11 and 1.12, with a coating, such as 1.13, which is sandwiched between them.

If, as in the illustrated embodiment, the base strip 8 extends asymmetrically over the plane of the plate, a plurality (2×7) of double slats are created, each having a different length and therefore a different resonance frequency.

If, as also shown in the embodiment, the layer thickness of the individual plate elements increases from layer to layer (from 1 to 7), the number of slats with different resonance frequencies is multiplied by the number of layers.

The following equation may be used to calculate the resonance frequencies of the double slats having a constant cross-sectional course:

$$f_n = \frac{S_n^2}{2\pi l^2} \sqrt{\frac{I \cdot E}{A \cdot \rho}}$$

wherein $s_n$: natural frequency factor l: length of slat

I: geometrical moment of inertia

A: cross-sectional surface of slat

E: modulus of elasticity p: density

The natural frequency factors depend on the manner of the clamping of the slats and on the ordinal of the natural vibration. In "Technische Akustik" ("Technical Acoustics") by IVAR VEIT, Publishers: Vogel Fachbuch, 4th Edition, 1988, the following factors are indicated for the fundamental oscillation and the first 4 harmonic oscillations for a rod which is clamped in on one side and which may be considered to be the equivalent of the absorber slat according to the invention:

$s_1$=1.875 (fundamental oscillation)

$s_2$=4.694 (1st harmonic oscillation)

$s_3$ =7.855 (2nd harmonic oscillation)

$s_4$ =10.996 (3rd harmonic oscillation)

$s_5$=14.137 (4th harmonic oscillation)

By the connecting of two slat elements to form a double slat with an intermediate damping layer, a coupling factor must be taken into account with respect to the determination of the resonance frequency of such a double slat. Thus, the following will apply:

$$f_{nD}=K.f_n.$$

wherein $f_{nD}$: natural frequency of the double slat

K: coupling factor.

According to the material, the coupling factor ranges between the values of 1 and 2. In the case of a very soft damping mass, the natural frequency of the double slat will increase only insignificantly; in the case of a very hard damping mass, the coupling factor of almost 2, thus a frequency doubling, is obtained.

A gradation of the slats according to the following rule is particularly advantageous:

$$l_n = l_o \cdot \left(\frac{f_1}{f_2}\right)^{\frac{n}{2N}}$$

wherein $l_n$=length of the nth slat $l_o$=length of the longest slat n=course index between 0 and N−1

N=total number of different slat lengths $f_1$=first resonance frequency of the longest slat $f_2$=second resonance frequency of the longest slat.

The provision of double slats with different damping layers results in an expansion of the temperature range for the vibration absorber.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Resonance absorber for damping structure-borne vibrations, comprising:

a common base member for connecting said resonance absorber with a body to be damped; and a plurality of free-swinging vibration absorbing elements mounted on said common base member wherein;

each of said vibration absorbing elements comprises a double slat structure having at least two slats, with a damping coating sandwiched between said two slats; and each of said vibration absorbing elements has a resonance frequency which differs from resonance frequencies of other vibration absorbing elements.

2. Resonance absorber according to claim 1, wherein the two slats of each vibration absorbing element are congruent with each other.

3. Resonance absorber according to claim 1, wherein a plurality of double slats are arranged in stacks one above another and separated from each other at fixed distances, each of said double slats being coupled with said common base member for receiving structure-borne noise vibrations.

4. Resonance absorber according to claim 2, wherein a plurality of double slats are arranged in stacks one above another and separated from each other at fixed distances, each of said double slats being coupled with said common base member for receiving structure-borne noise vibrations.

5. Resonance absorber according to claim 3, wherein the double slats of a stack are congruent but have different thicknesses.

6. Resonance absorber according to claim 1, wherein several double slats of different lengths are coupled side-by-side with a common base.

7. Resonance absorber according to claim 5, wherein several double slats of different lengths are coupled side-by-side with a common base.

8. Resonance absorber according to claim 1, wherein said double slats are arranged in layers, each layer comprising double slats of differing lengths, at opposite ends of two congruent rectangular or square plates, with a central base strip extending diagonally across a surface of said plates.

9. Resonance absorber according to claim 6, wherein said double slats are arranged in layers, each layer comprising double slats of differing lengths, at opposite ends of two congruent rectangular or square plates, with a central base strip extending diagonally across a surface of said plates.

10. Resonance absorber according to claim 8, wherein layers of double slats with different thicknesses and congruent base strips are stacked above one another, first ends of the double slats being free-standing, and second ends of thereof being mechanically coupled with said base strip.

11. Resonance absorber according to claim 1, wherein the damping coating within respective double slats in a stack of double slats differs from layer to layer.

12. Resonance absorber according to claim 10, wherein the damping layer within a stack of double slats differs from layer to layer.

13. Resonance absorber according to claim 1, wherein lengths of the double slats are determined according to the following equation:

$$l_n = l_o \cdot \left(\frac{f_1}{f_2}\right)^{\frac{n}{2N}}$$

wherein $1_n$=length of the nth slat $1_o$=length of the longest slat n=course index between 0 and N−1

N=total number of slats $f_1$=first resonance frequency of a slat which is longest of said slats $f_2$=second resonance frequency of a slat which is longest of said slats.

14. Resonance absorber according to claim 3, wherein lengths of the double slats are determined according to the following equation:

$$l_n = l_o \cdot \left(\frac{f_1}{f_2}\right)^{\frac{n}{2N}}$$

wherein $1_n$=length of the nth slat $1_o$=length of the longest slat n=course index between 0 and N−1

N=total number of slats $f_1$=first resonance frequency of a slat which is longest of said slats $f_2$=second resonance frequency of a slat which is longest of said slats.

15. Resonance absorber according to claim 8, wherein lengths of the double slats are determined according to the following equation:

$$l_n = l_o \cdot \left( \frac{f_1}{f_2} \right)^{\frac{n}{2N}}$$

wherein $l_n$=length of the nth slat $l_o$=length of the longest slat n=course index between 0 and N−1

N=total number of slats $f_1$=first resonance frequency of a slat which is longest of said slats $f_2$=second resonance frequency of a slat which is longest of said slats.

16. Resonance absorber according to claim 11, wherein lengths of the double slats are determined according to the following equation:

$$l_n = l_o \cdot \left( \frac{f_1}{f_2} \right)^{\frac{n}{2N}}$$

wherein $l_n$=length of the nth slat $l_o$=length of the longest slat n=course index between 0 and N−1

N=total number of slats $f_1$=first resonance frequency of a slat which is longest of said slats $f_2$=second resonance frequency of a slat which is longest of said slats.

17. Resonance absorber for damping structure-borne vibrations, comprising:

at least one common base member for mechanically coupling said resonance absorber to receive vibrations from a body to be damped;

a plurality of vibration damping elements each of which is coupled to said at least one common base member at a first end thereof and is free to vibrate at a second end thereof opposite said first end, and along a length thereof between said first and second ends;

wherein each of said vibration damping elements comprises at least two slats, with a damping layer sandwiched therebetween; and wherein each of said vibration damping elements has a resonance frequency which is different from a resonance frequency of others of said vibration damping elements.

18. Resonance absorber according to claim 17 wherein each of said vibration damping elements is free to vibrate independently of adjacent vibration damping elements.

19. Resonance absorber according to claim 17 wherein said vibration damping elements are arranged in layers, each layer comprising a plurality of vibration damping elements.

20. Resonance absorber according to claim 19 wherein each of said vibration damping elements within a layer has a length which is different from that of other vibration damping elements in said layer.

21. Resonance absorber according to claim 20 wherein all of said vibration damping elements within a layer have the same thickness, which thickness is different from that of vibration damping elements in other layers.

22. Resonance absorber according to claim 20 wherein said vibration damping elements in a layer are defined by a sequence of slots of differing length in said layer.

* * * * *